(12) United States Patent
Stefan (10) Patent No.: US 8,811,272 B2
(45) Date of Patent: Aug. 19, 2014

(54) METHOD AND NETWORK FOR WLAN SESSION CONTROL

(75) Inventor: Rommer Stefan, Gothenburg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 2552 days.

(21) Appl. No.: 10/595,026

(22) PCT Filed: Dec. 4, 2003

(86) PCT No.: PCT/SE03/01882
§ 371 (c)(1),
(2), (4) Date: Dec. 21, 2005

(87) PCT Pub. No.: WO2005/004406
PCT Pub. Date: Jan. 13, 2005

(65) Prior Publication Data
US 2006/0253893 A1 Nov. 9, 2006

(30) Foreign Application Priority Data
Jul. 3, 2003 (SE) .................................... 0301964

(51) Int. Cl.
*H04W 4/00* (2009.01)
(52) U.S. Cl.
USPC ........... 370/328; 455/406; 455/408; 455/410; 455/411; 455/435.1; 455/524
(58) Field of Classification Search
CPC ..... H04W 28/00; H04W 36/10; H04W 36/16; H04W 48/00; H04W 48/16; H04W 76/06; H04W 80/08
USPC ....................... 370/328; 455/410–411, 435.1, 455/524–524, 406, 408
See application file for complete search history.

(56) References Cited

U.S. PATENT DOCUMENTS

| 6,473,413 | B1 | 10/2002 | Chiou et al. |
| 6,862,444 | B2 * | 3/2005 | Karaoguz et al. ............. 455/408 |
| 7,197,125 | B1 * | 3/2007 | Prasad et al. ............. 379/201.02 |
| 2003/0050041 | A1 * | 3/2003 | Wu .............................. 455/406 |
| 2003/0145092 | A1 * | 7/2003 | Funato et al. ................. 709/229 |
| 2003/0169713 | A1 * | 9/2003 | Luo .............................. 370/338 |
| 2003/0177267 | A1 * | 9/2003 | Orava et al. ................... 709/245 |

(Continued)

FOREIGN PATENT DOCUMENTS

| EP | 1320214 A1 * | 6/2003 |
| WO | WO 2004109535 A1 * | 12/2004 |

OTHER PUBLICATIONS

Authors: Junbiao Zhang, Jun Li, Stephen Weinstein and Nan Tu; Title: Virtual Operator Based AAA in Wireless LAN Hot Spots with Ad-Hoc Networking Support; Date: Jun. 2002; Publisher: ACM; vol. 6; Issue 3.*

(Continued)

*Primary Examiner* — Amancio Gonzalez
(74) *Attorney, Agent, or Firm* — Roger S. Burleigh (57) ABSTRACT

A network is provided comprising at least one access point and one access-controlling node whereby the identity of the station can be approved by the access controlling node. The at least one access-controlling node issues at least one Inter-Access Point Protocol message causing the access point with which the station is currently associated to disassociate the given station thereby terminating the access for the given station.

8 Claims, 8 Drawing Sheets

(56) References Cited

U.S. PATENT DOCUMENTS

| | | | |
|---|---|---|---|
| 2004/0008652 A1* | 1/2004 | Tanzella et al. | 370/338 |
| 2004/0073672 A1* | 4/2004 | Fascenda | 709/225 |
| 2004/0193513 A1* | 9/2004 | Pruss et al. | 705/30 |
| 2004/0248547 A1* | 12/2004 | Philsgard et al. | 455/405 |
| 2004/0258031 A1* | 12/2004 | Zabawskyj et al. | 370/338 |
| 2006/0013174 A1* | 1/2006 | Sanda | 370/338 |
| 2006/0092888 A1* | 5/2006 | Jeong et al. | 370/338 |
| 2008/0101291 A1* | 5/2008 | Jiang et al. | 370/331 |

OTHER PUBLICATIONS

Title: Lucent Technologies Enables High Speed Internet Access Everywhere—At Home, At Work and in Public Hot Spots ORINOCO(TM): Your mobile broadband connection. The new WaveLAN(R). Date: Feb. 28, 2000; Publisher: PR Newswire, New York, p. 1.*

Jin Xiaohui, Li Jiandong, 'IAPP Enhancement Protocol', Nov. 2001, IEEE. pp. 340-345.

Jin Xiaohui, Li Jiandong, 'IAPP Enhancement Protocol', Nov. 2001, IEEE document, Retrieved on Aug. 3, 2008 from Internet:, http://ieeexplore.ieee.org/ie15/7719/21186100983601.pdf?tp=&arnumber=983601&isnumber=21186, line 19—p. 341, line 11 p. 342, line 33 p. 343, line 19, figure 6 and abstract.

Duolog Technologies, 'WLAN Access Point IAPP Solution', 2002, Retrieved on Aug. 3, 2004 from Internet: http://www.duolog.com/pdf/iapp2.pdf, See whole document.

Swedish Patent Office, International Search Report for PCT/SE2003/001882, dated Mar. 9, 2004.

* cited by examiner

METHOD AND NETWORK FOR WLAN SESSION CONTROL

FIELD OF THE INVENTION

The invention relates to the field of providing session control in WLAN based networks. More particularly the invention relates to a method for session control in RADIUS-based networks. The invention may advantageously be utilised for providing timely user information in pre-paid WLAN solutions.

PRIOR ART

Wireless LAN (WLAN), and in particular WLAN based on the IEEE 802.11 standard, has in the last few years received tremendous interest. WLANs are used in home and enterprise environments. WLANs have also become available to WLAN subscribers at public sites, so called hot-spots, e.g. cafes, airports etc. In order to finance these hot spots, the owner of the WLAN infrastructure, such as the service provider, must be able to control access to the WLAN in order to charge customers for its use.

Figure 1:
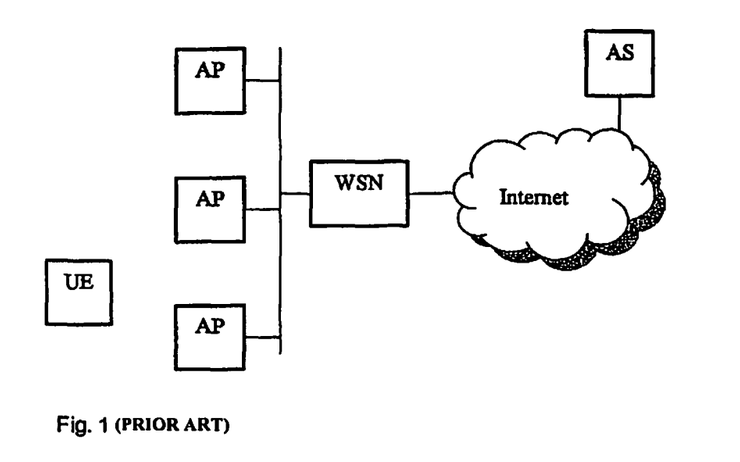
FIG. 1 shows a hot spot network having a number of Access Points (AP) and one or more access servers, here called WLAN Serving Node (WSN) and an access server (AS)

A hot spot typically has a number of Access Points (AP) and one or more access servers, here called Wireless Serving Node (WSN) and an authentication server (AS) as illustrated in FIG. 1. The functionality of the WSN could also be integrated with each AP. The AS does not have to reside at the hot spot network but could be centrally located by the service provider or somewhere in the Internet.

The most common solution today is that the access control and the collecting of accounting data are performed by the WSN. This solution has been schematically illustrated in FIG. 2. The APs are simply pass-through devices when it comes to access control. Users log in to the system using a HTTP (Hypertext Transfer Protocol) web interface between the UE (User equipment) and WSN. The HTTP traffic between UE and WSN is typically cryptographically protected by e.g. SSL (Secure Socket Layer). In order to verify the credentials received from the UE, the WSN (Wireless Serving Node) typically has a Remote Authentication Dial In User Service (RADIUS) client that communicates with an Authentication Server (AS).

Figure 2:
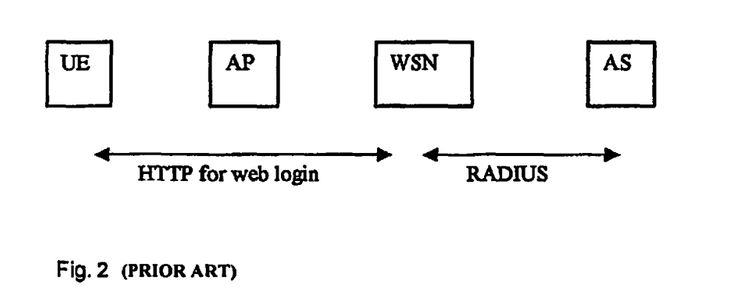
FIG. 2 shows a prior art network where access control and collection of accounting data is performed by a gateway node (WSN)
Figure 4:
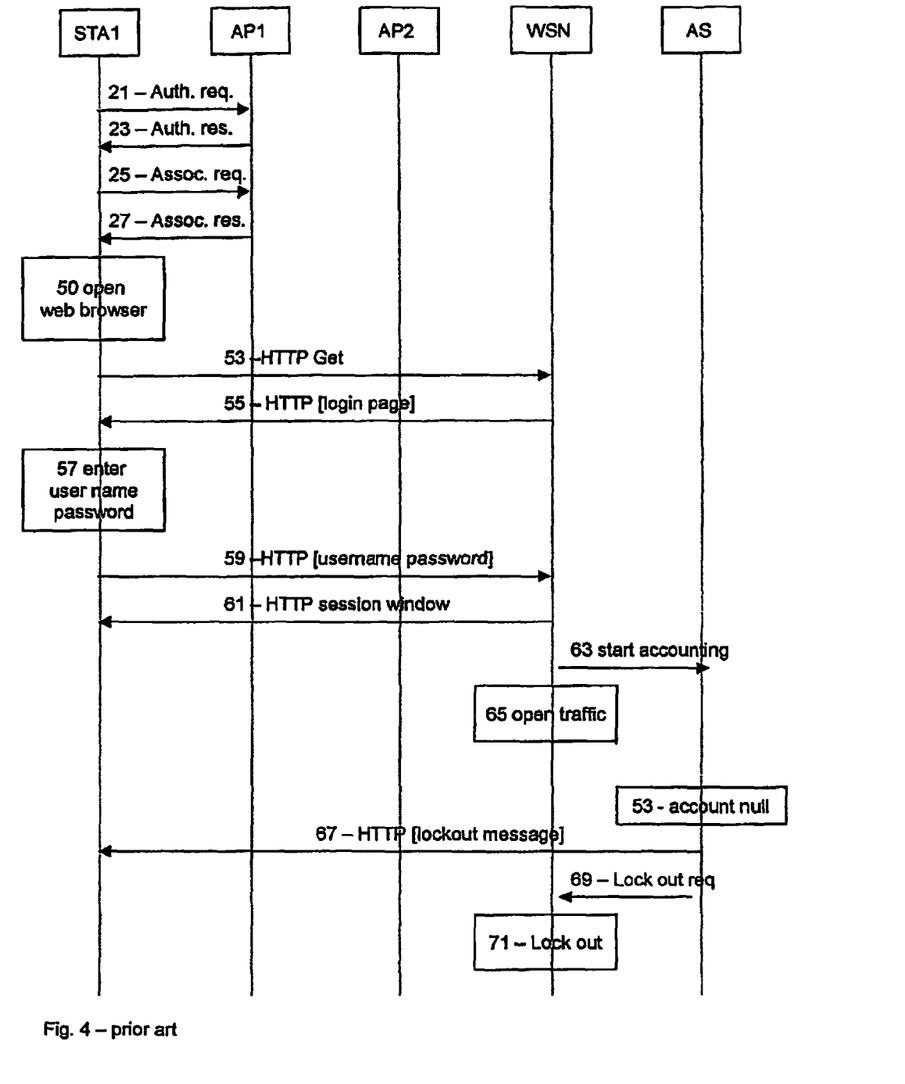
FIG. 4 shows an exemplary prior art process of a user first connecting to a hot spot access point arrangement of FIG. 2 and subsequently running out of credit is shown, whereby the authorisation is facilitated by means of "web login" (HTTP)

In FIG. 4, the exemplary process of a user first connecting to a hot spot access point arrangement of FIG. 2 and subsequently running out of credit is shown, whereby the authorisation is facilitated by means of "web login" (HTTP).

In steps 21-27 the well-known steps of the station STA1 authenticating itself and subsequently being accepted for association by the access point AP1 is shown. In step 50 the user of the station opens a web browser and forwards a HTTP Get request 53. The requested web address (URL) does not have to point to the gateway node WSN since the WSN can intercept and redirect the request. The gateway node responds by issuing a HTTP log in page 55. The user then enters his name and password 57 and forwards this information 59 to the gateway node WSN. Upon acceptance the gateway provides a HTTP session window 61, issues a start accounting message to the authentication server AS 63 and opens for traffic to/from the station 65.

At some later stage the user may run out of credit This could be detected in different ways. The gateway can e.g. periodically report to the authentication server, which detects that the account is null 53. Alternatively, the AS, or some other network node, could have a timer to detect when the session should end. A HTTP lockout message 67 could be issued to the mobile station. Subsequently, the authentication server issues a lock out request 69, whereupon the gateway node locks out the station 71.

Figure 3:
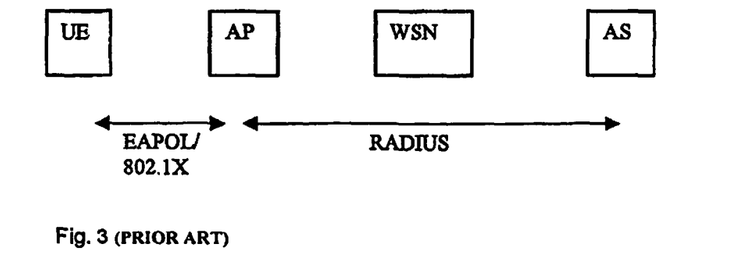
FIG. 3 shows a prior art method, denoted IEEE 802.1X, for performing access control at an extended level of security under e.g. the IEEE 802.11i standardization task group and Wi-Fi Protected Access.

Recently, a new method, denoted IEEE 802.1X, for performing access control at an extended level of security has been introduced under the IEEE 802.11i standardization task group and elsewhere. According to this method, schematically illustrated in FIG. 3, access control is performed in the AP. For this purpose, the AP typically has a RADIUS client that talks to the AS. The UE and AS communicate using the Extensible Authentication Protocol (EAP). The WSN may still be used to provide various kinds of services, e.g. collecting accounting data, enforcing user profiles etc.

When the UE moves it may leave radio coverage of one AP (the "previous" AP) and move into coverage of another AP (the "subsequent" AP). In this case the UE has to make a handover from the previous AP to the subsequent AP. The IEEE 802.11 standard provides a method for making this handover. In particular, there is support for the 802.11-defined Association with the subsequent AP but there is no way to tell the previous AP that the UE has moved to another AP. The previous AP has to discover by implicit means, e.g. based on timeouts, that the UE is no longer in its cell.

To remedy this problem a new recommended practice has been approved according to 802.11F that specifies an Inter-AP Protocol (IAPP). The purpose of this protocol is to introduce a standardized way for APs to communicate when an UE associates or makes a handover. According to the IAPP, the "subsequent" AP can send an IAPP message to the "previous" AP and let it know that the UE is now associated with the "subsequent" AP. The "previous" AP can then remove the UE from its memory. The "previous" AP shall at that point also send an 802.11 Disassociation message to the UE according to 802.11F. Moreover, the IAPP facilitates transfer of cryptographically protected information between the APs.

Figure 5:
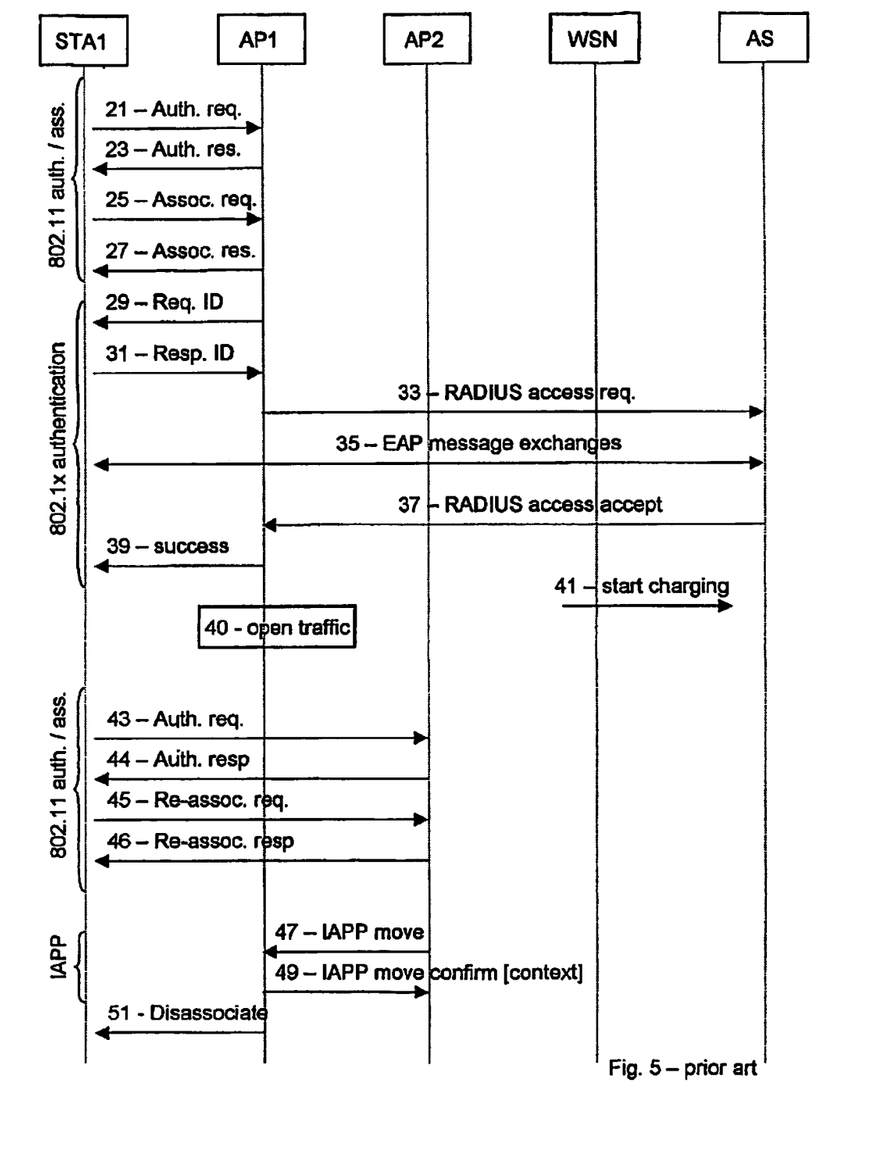
FIG. 5 is an exemplary prior art handshake diagram illustrating the process of a user approaching and connecting to a hot spot access point and subsequently moving to another AP within the hot spot network being configured as in FIG. 1 using RADIUS and 802.1X authentication and IAPP.

In FIG. 5, an exemplary handshake diagram illustrates the process of a user approaching and connecting to a hot spot access point and subsequently moving to another AP within the hot spot network being configured as in FIG. 1 using RADIUS and 802.1X authentication and 802.11F.

The legacy 802.11 steps of authentication and association are performed in steps 21-27 after the Station STA1 comes within reach of the AP1. Subsequently, an 802.1X authentication procedure before the authentication server AS is initiated. The AP issues a request ID 29 and the station responds 31. The access point AP1 sends a RADIUS access request 33 to the authentication server AS with information about the user identity. Then follows an EAP message exchange 35 to perform the authentication. The details of this exchange depend on which authentication method is used. Here EAP is chosen by way of example. If the authentication is successful, the AS sends a RADIUS access accept 37 and the AP transmits a success 39 to the station, while the AP opens for traffic 40 for the station in question. The gateway node WSN initiates charging 41 of the traffic running through it relating to the station.

Should the station move into the approach of AP2, 802.11 legacy steps of authentication and re-association is performed in steps 43-46. According to the IAPP protocol, AP2 issues the IAPP move message 47 to AP1, which responds with an IAPP move confirm message 49, which may include a context including e.g. the credentials relating to the authentication between the station STA1 and the authentication server AS. Finally, AP1 may issue a Disassociate message 51 to AP1 according to 802.11F, which is now informed that it can cancel information relating to STA1.

Some AP vendors have implemented an IAPP related (non-standardized) functionality: If a layer-2 frame appears on the wired network side of the (previous) AP with the UE's MAC address as the source address, the AP knows that the UE must be associated to some other (subsequent) AP. The previous AP can then remove the UE from its memory and transmit a Disassociation message to the UE.

In many cases it may be desirable to close an ongoing session from the WSN or some other node that is not the AP, e.g. if the user has a pre-paid account that runs out of credit. Another scenario is that the user has been idle for a long time, e.g. if he/she has left the laptop at the hot spot unattended. In this case the WSN may want to force the UE to perform a re-authentication. The WSN can easily close an active session and/or force a re-authentication if access-control is performed in WSN, e.g. if web-login is used.

If the system is running 802.1X the situation is different. In this case access control is performed in the APs and there is no standardized way for the WSN to tell the APs to close an active session or to force a re-authentication. In particular, RADIUS has no server-initiated messages that can be used by the WSN or other entity to e.g. close the session or to initiate a new authentication.

The solution where the WSN just blocks all traffic to/from the user is not useful since the user will not be able to discover why he/she has no access to the internet. In a scenario without the WSN it is not even possible to block the traffic from the UE in question.

One possible solution is that the WSN waits for the next re-authentication. Subsequently, the AS may reject this re-authentication attempt. Moreover, since the RADIUS messages from the RADIUS client in the AP will pass the WSN, the WSN can make sure that the authentication is rejected. In any case the session will end. The drawback with this solution is that the time between re-authentications can be long (default 802.1X re-authentication interval is one hour). The WSN will thus have a very weak control of the session.

Another possibility is to implement a proprietary protocol between AP and WSN for session control. The drawback with this solution is that only APs of a certain type can be used together with the WSN.

A third possibility is to use DIAMETER instead of RADIUS as the authentication protocol since DIAMETER has server-initiated messages that can be used to close a session. However, RADIUS is the single preferred solution by vendors today and the author of this invention knows of no APs with DIAMETER support.

SUMMARY OF THE INVENTION

It is a first object of the invention to set forth a network for a controlling a station to terminate its access to a given AP.

It is a further object to set forth an access control node, for a controlling a station to terminate its access to a given AP.

It is a further object to set forth a method, for a controlling a station to terminate its access to a given AP.

Further advantages will appear from the detailed description of the invention.

DETAILED DESCRIPTION OF PREFERRED EMBODIMENTS OF THE INVENTION

According to the invention the WSN or another non-AP network node uses the IAPP protocol and/or the layer-2 frames to cancel a session in one or several APs. According to the invention the termination could typically be used in connection with an accounting system, whereby the access termination is caused by the exhaustion of a given account of a using entity. It is a prerequisite for the invention that the AP supports the IAPP functionality described above in relation to the prior art Hence, the invention could appropriately be used in a scenario where an agreement has been made between the AP's in question, the WSN and the AS. One party could also own these entities.

Figure 6:
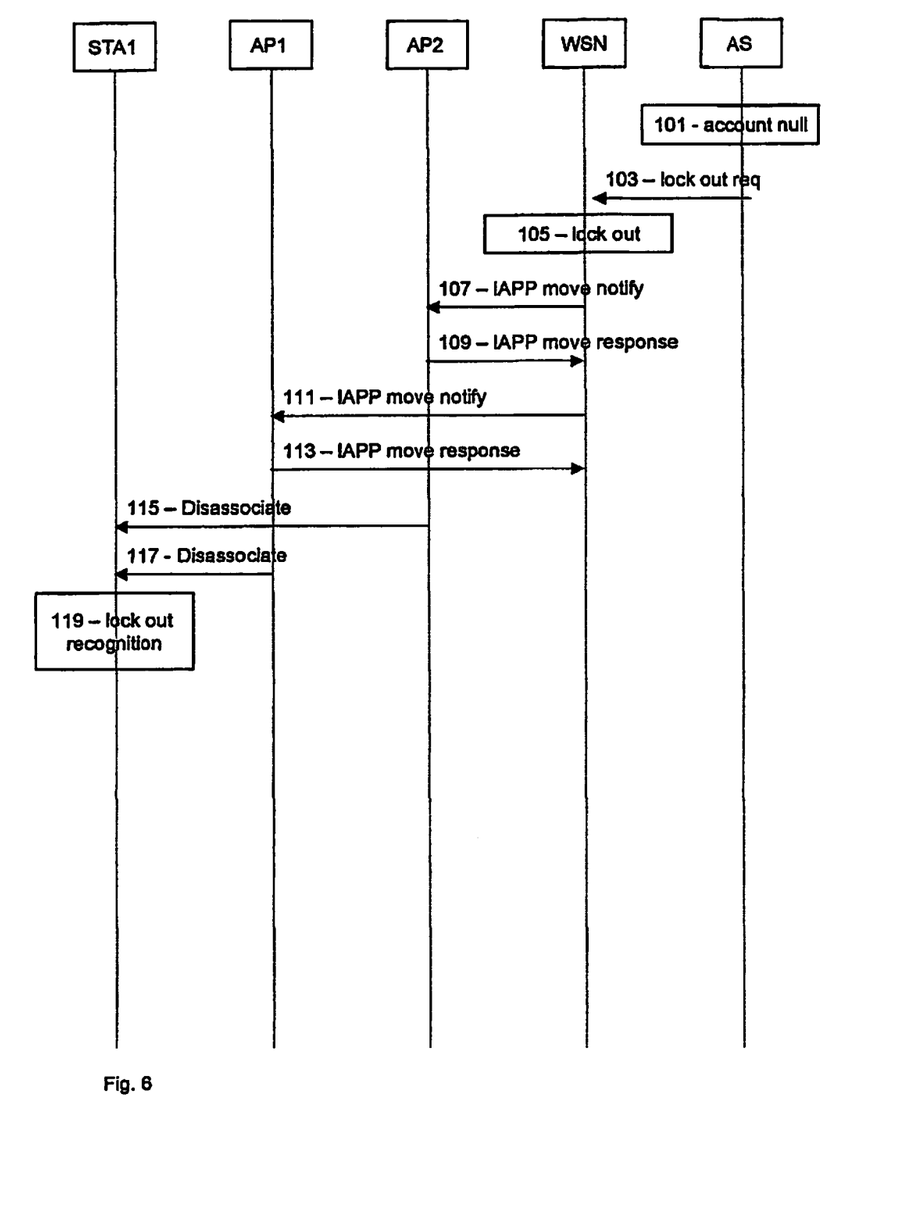
FIG. 6 is a handshake diagram of a first embodiment according to the invention having a network topology resembling the prior art network shown in FIG. 1.

In FIG. 6 a first embodiment according to the invention has been shown. The architecture of the network could advantageously resemble the prior art network shown in FIG. 1, whereby a station STA is connected to AP's AP1 or AP2 of the same network segment but where the node WSN does not necessarily function as a gateway, i.e. constitute the only route to the Internet. Rather, the function of the WSN node will be elucidated in the following description.

In step 101, the account relating to the station STA is exhausted and the AS transmits a Lock out Request 103 to the WSN node in order to notify the WSN that the user in question should cease to have access to the Internet If the WSN has a gateway position, i.e. it constitutes the only route to the Internet for AP1 and AP2, the WSN node could block traffic relating to STA1. This option has been shown by the lock out action 105.

Subsequently, the WSN issues an IAPP move notify to the AP's AP1 and/or AP 2 as indicated by steps 107 and 111. If the WSN knows to which AP the STA1 is associated, it may be enough to issue an IAPP move notify to that AP. It is noted that the WSN not necessarily being an AP is emulating an AP by issuing AP specific messages, originally intended only for AP's.

AP1 and AP2 respond by issuing IAPP move response messages 109 and 113 and at that point the access in the AP's is withdrawn for the using entity STA1 in question. Subsequently, the AP's send Dissociate messages 115 and 117 to station STA1 whereby it is possible for an application running on the station, such as a browser, to positively inform the user that access has been withdrawn, as indicated by the lock out indication in step 119.

Hence, according to the invention a network has been provided comprising at least one access point AP1, AP2 and one access controlling node WSN, AS, whereby the identity of the station can be approved by the access controlling node AS. The at least one access-controlling node WSN issues at least one IAPP message causing the AP with which the station is currently associated to disassociate the given station and thereby terminating the access for the given station.

Advantageously, an entity, such as a service provider, could engage an agreement with a given subset of AP's.

According to the invention a method of terminating access for a WLAN station has been provided comprising the steps of
- monitoring whether a given station is having access to any of a given subset of access points and monitoring an account relating to the given station being associated with a given access point of the subset of access points
- if detecting that the account relating to the given station is zero
- issuing an IAPP message causing the access point of the subset with which the given station is associated to disassociate the given station.

Figure 7:
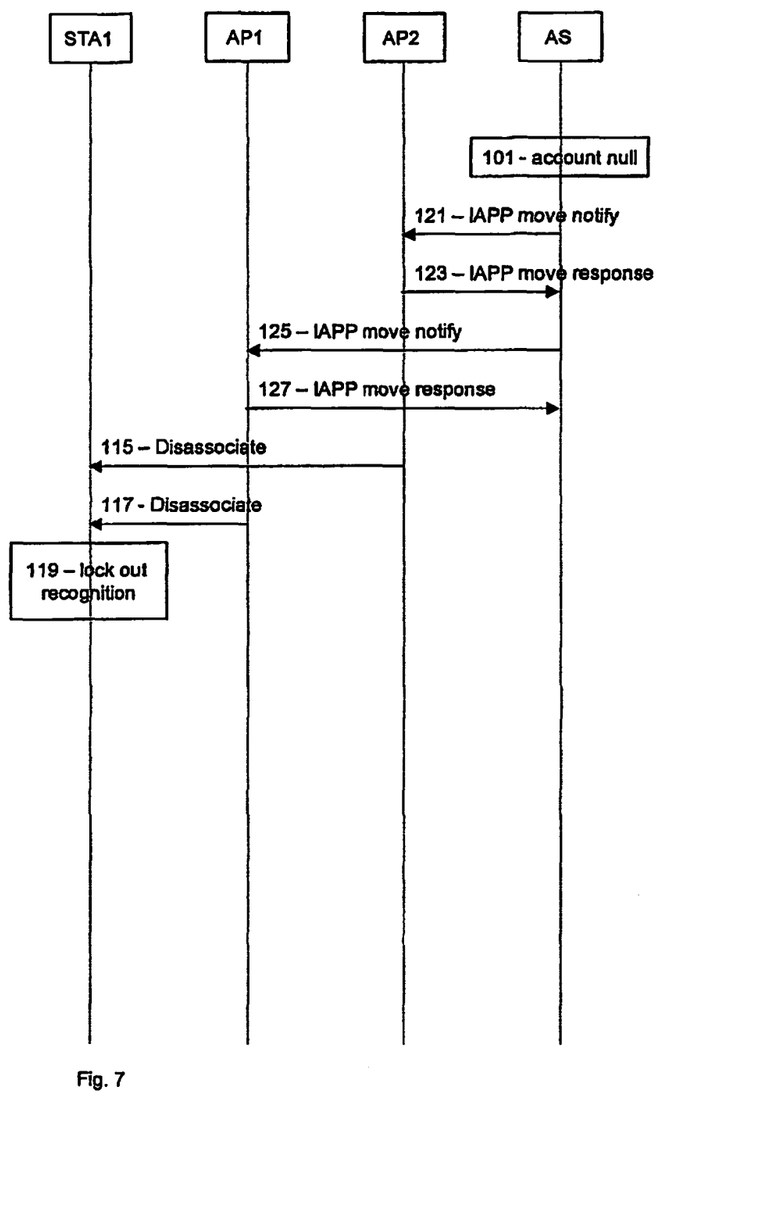
FIG. 7 is a handshake diagram of a second embodiment according to the invention

According to a second embodiment of the invention, the network topology as in FIG. 1 except that no separate WSN node is provided is envisaged. This embodiment is shown in FIG. 7. At step 101 it is detected that the account of STA1 is null and the AS issues IAPP move notify messages 121 and 125 over the Internet to AP1 and/or AP2. The latter AP's take note of what they perceive as a move of STA1 and withdraw access for STA1 to the Internet. Subsequently, AP1 and AP2 responds to the AS by issuing IAPP move response messages 123 and 127. Followingly, Disassociate messages 115 and 117, according to 802.11F, may be issued from the AP2 with which the STA1 was recently associated. Disassociate message 117 is received by STA1 whereby the user can be informed as explained above.

Figure 8:
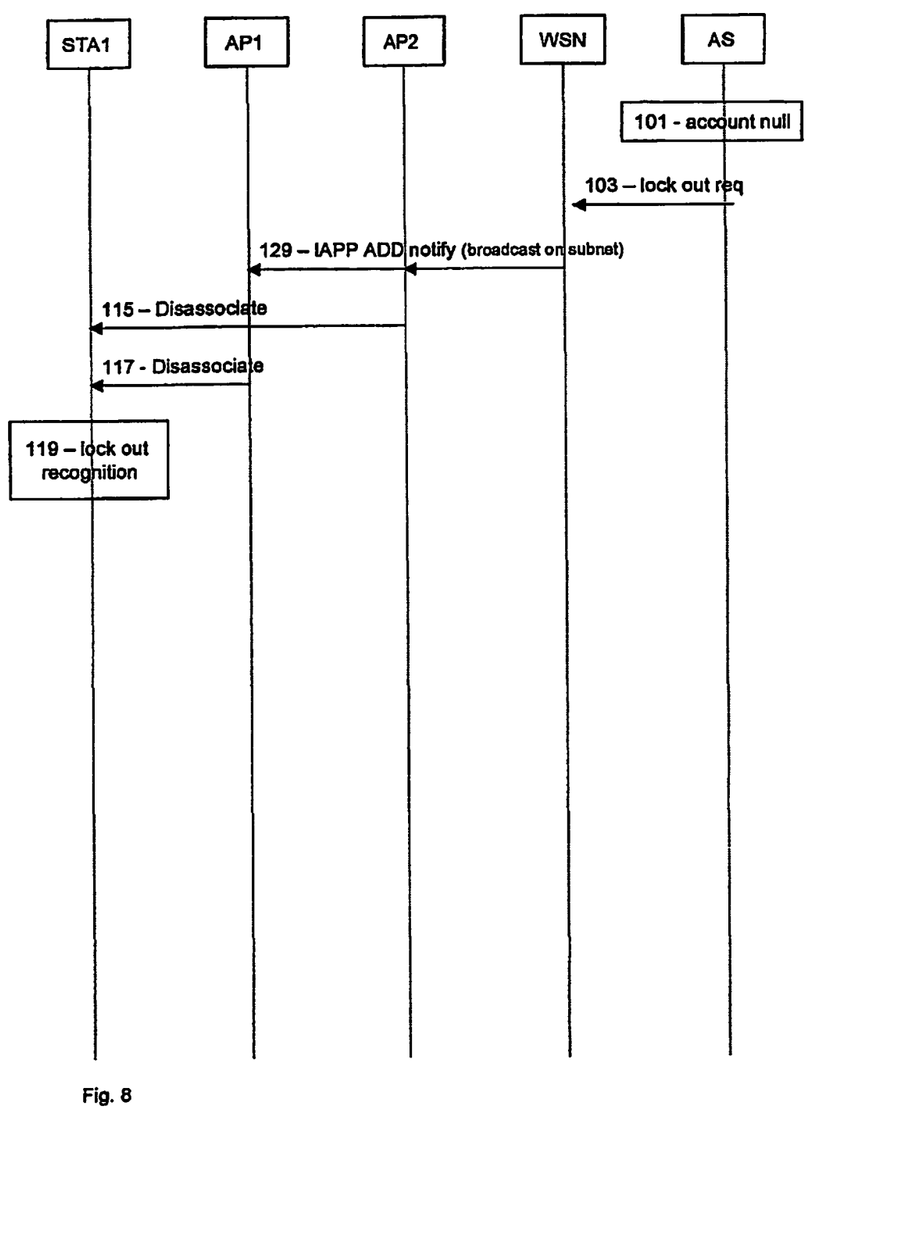
FIG. 8 is a handshake diagram of a third embodiment according to the invention

In FIG. 8, a third embodiment of the invention has been shown wherein a network topology as illustrated in FIG. 1 is shown. In this embodiment the WSN or the non-AP network node broadcasts an IAPP ADD-notify frame 129 to all the AP's, which in the case in point amounts to AP1 and AP2. For the AP's it will appear as the STA1 has been associated to a subsequent AP (virtually the WSN) and AP2 with which the STA1 is recently associated will consequently disassociate the UE, by issuing Disassociate messages 115 and 117, the latter being received by STA1.

Figure 9:
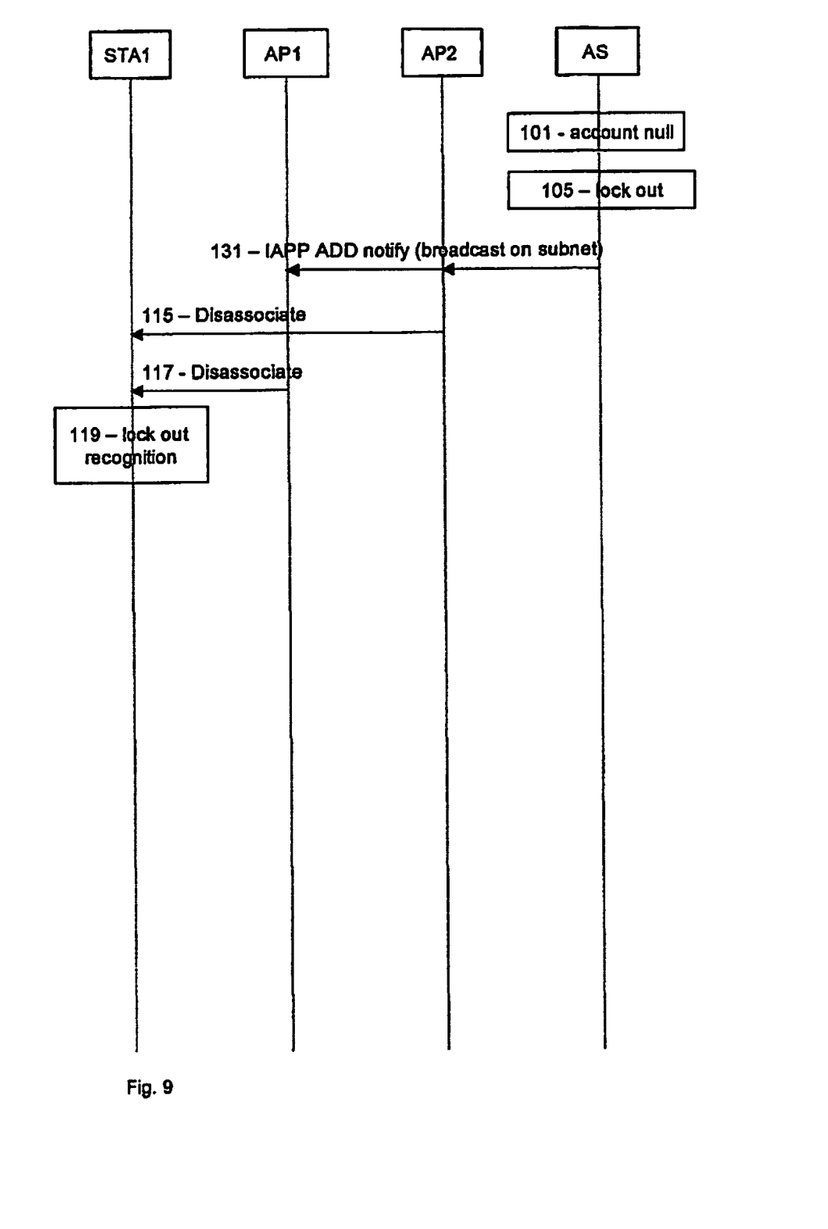
FIG. 9 is a handshake diagram of a fourth embodiment according to the invention.

It is noted that since IAPP messages are transported in IP packets, the WSN does not have to reside on the same subnet as the APs. The WSN could send a subnet-directed broadcast 131 to the subnets with the APs of interest. This embodiment has been illustrated in FIG. 9.

The WSN could also (or instead) broadcast a layer-2 frame with the UE's MAC address as source address to all the APs. This will make all APs believe that the UE has made a handover to a subsequent AP (in this case the subsequent AP is the WSN) and will consequently disassociate the UE.

Since, a party not being engaged in providing the actual access for the station in question, is responsible for effectuating the cease of access, one could imagine that denial of service attacks by a rogue AP could be a problem.

Figure 10:
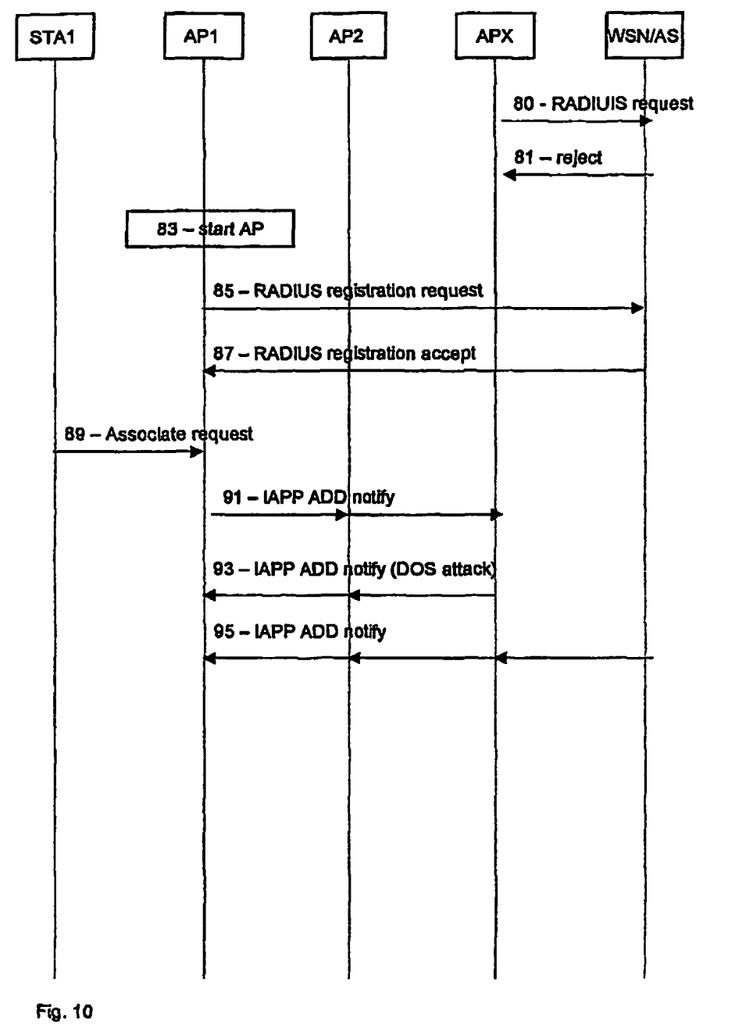
FIG. 10 is a handshake diagram relating to denial of service attack in relation to the invention.

However, this is not necessarily the case as shall be explained with reference to FIG. 10, where a rogue AP, APX, seeks to register as a valid AP, step 80, as described in 802.11F. If, according to known features of RADIUS, the AP cannot show up the necessary credentials, the request will be rejected as exemplified in step 81.

Initially when a RADIUS enabled AP client is powered up on the network, step 83, it issues a RADIUS registration access-request 85 to the WSN or the AS, and the latter node responds with a RADIUS registration access-accept 87 containing means for cryptographically protecting IAPP ADD messages.

A station STA1 may subsequently associate with an AP, as shown instep 89.

When IAPP messages such as the IAPP ADD notify are received, step 91, 93, 95, the authenticity of these messages as being sent by a proper member of the network can easily be proved by performing a cryptographical operation. If the IAPP message are not cryptographically protected by appropriate keys, the operation will provide a false result and a Denial of Service attack, as illustrated in step 93, will fail, whereas the identity of true RADIUS clients can be ascertained, confer IAPP ADD notify message 95.

IEEE 802.11F also provides methods for cryptographically protecting IAPP MOVE messages between two APs. Also these methods utilize a RADIUS server (e.g. WSN or AS) to distribute the key material.

REFERENCES

IEEE Standard 802.11-1999; Wireless LAN Medium Access Control (MAC) and Physical Layer (PHY) Specifications
IEEE Standard 802.1X-2001; Port-Based Network Access Control
IEEE Draft Recommended Practice 802.11F
RFC 2865; RADIUS
RFC 2284: EAP

The invention claimed is:

1. A network comprising at least one access point (AP) and one access controlling node, the access points making use of the Inter-Access Point Protocol (IAPP) for communication, wherein at least one mobile station may associate with the access points, wherein the identity of the mobile station can be approved by the access controlling node, wherein:
the access controlling node monitors whether a given mobile station has access to any of a given subset of access points and monitors an account relating to the given mobile station associated with a given access point of the subset of access points; and,
if detecting that the account relating to the given mobile station has a balance of zero,
the at least one access-controlling node issues at least one IAPP message causing the access point of the subset with which the mobile station is currently associated to disassociate the given mobile station, thereby terminating access for the given mobile station.

2. The network according to claim 1, wherein the access controlling node is an authentication server connected to the Internet.

3. The network according to claim 2, wherein a second access control node is provided, the second access control node being a gateway node.

4. The network according to claim 2, wherein the access controlling node issues an IAPP ADD-notify message.

5. The network according to claim 2, wherein the access controlling node issues an IAPP MOVE-notify message.

6. The network according to claim 3, wherein the access controlling node issues a Lock out request to the gateway node.

7. An access controlling node for connecting to a group of access points, the access points making use of the Inter-Access Point Protocol (IAPP) for communication and providing access to at least one mobile station, wherein the identity of the mobile station can be approved by the access controlling node, wherein:

the access controlling node monitors whether a given mobile station has access to any of a given subset of access points and monitors an account relating to the given mobile station associated with a given access point of the subset of access points; and, if detecting that the account relating to the given mobile station is zero, the access-controlling node issues at least one IAPP message causing the access point of the subset with which the mobile station is currently associated to disassociate the given mobile station, thereby terminating access for the given mobile station.

8. A method of terminating access for a Wireless Local Area Network (WLAN) mobile station, comprising the steps of:

monitoring whether a given mobile station has access to any of a given subset of access points and monitoring an account relating to the given mobile station associated with a given access point of the subset of access points; and, if detecting that the account relating to the given mobile station has a balance of zero, issuing an Inter-Access Point Protocol (IAPP) message causing the access point of the subset with which the given station is associated to disassociate the given station.

* * * * *

UNITED STATES PATENT AND TRADEMARK OFFICE
CERTIFICATE OF CORRECTION

| | | |
|---|---|---|
| PATENT NO. | : 8,811,272 B2 | Page 1 of 1 |
| APPLICATION NO. | : 10/595026 | |
| DATED | : August 19, 2014 | |
| INVENTOR(S) | : Stefan | |

It is certified that error appears in the above-identified patent and that said Letters Patent is hereby corrected as shown below:

Title Page 2, Item (56) under "OTHER PUBLICATIONS", in Column 2, Line 7,
delete "ie15/7719/21186100983601.pdf?" and insert -- ie15/7719/21186/00983601.pdf? --, therefor.

In Column 1, Line 62, delete "credit" and insert -- credit. --, therefor.

In Column 4, Line 37, delete "art" and insert -- art. --, therefor.

Signed and Sealed this
Fifteenth Day of March, 2016

Michelle K. Lee
*Director of the United States Patent and Trademark Office*